T. LONG.
Carriage-Spring.
No. 70,446.
Patented Nov. 5, 1867.
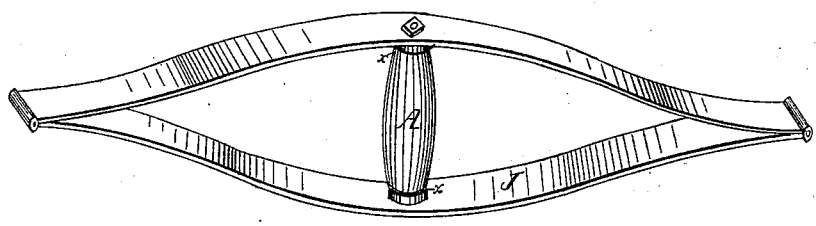
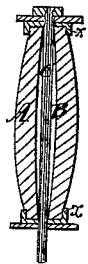

United States Patent Office.

THOMAS LONG, OF VANDALIA, ILLINOIS.

Letters Patent No. 70,446, dated November 5, 1867.

IMPROVEMENT IN ELASTIC SPRING FOR CARRIAGES.

*The Schedule referred to in these Letters Patent and making part of the same.*

TO ALL WHOM IT MAY CONCERN:

Be it known that I, THOMAS LONG, of Vandalia, in the county of Fayette, and State of Illinois, have invented a new and useful Improvement in Elastic Springs for Carriages and other purposes; and I do hereby declare that the following is a full, clear, and exact description of the construction and operation of the same, reference being had to the annexed drawings and letters of reference marked thereon, making a part of this specification, in which—

Figure 1 is a perspective representation of my spring attached to the common elliptic carriage-spring.
Figure 2 is a transverse section of the same.

The nature of my invention consists in making an elastic spring of peculiar construction, which will be best understood by reference to the drawings and following description. The construction of the spring differs from those used in giving elasticity to the bodies of cars, and in preventing the common elliptic carriage-spring from coming too closely together, in the following particulars: My spring is larger at the middle than at the ends, or, in other words, has convex sides, by which means the spring is able to resist a much greater force, considering the material used, than when the spring is made in the form of a cylinder or otherwise. By this means a spring is provided which will not kink under pressure, nor have a lateral motion at the centre, this being an important consideration in this kind of spring, from the fact that springs made of rubber or similar material could not be used of any considerable length without being housed or boxed to prevent a lateral motion. A further improvement is made in the spring by making the inner surface or opening concave, or largest in the centre of the spring, to correspond with the outside form, by which means a more vertical position is retained under pressure, by the use of less material, than has been heretofore obtained. The spring can be used for various purposes, such as for beds, carriages, cars, and all places where rubber springs have been used, and for many places where metal is now employed. I also use sockets X at the top and bottom of the spring, which prevent it from spreading or getting out of place when in use. I am well aware that rubber springs have been used to sustain car bodies, as bumpers for carriage-springs, and for very many similar purposes, but claim that the peculiar construction shown in the drawings is new, and possesses many advantages over any now in use.

To enable others skilled in the art to make and use my invention, I will describe its construction and operation.

A represents the construction of the rubber spring, having the concave opening B, through which the rod C passes, and holds in position sockets X, the rubber A, and the elliptic spring J. I cast the rubber A in a suitable mould, and according to the method used for such kind of work. The sockets X are made of metal, and fitted closely over the ends of the rubber A, in order to keep it in position when in use. When the spring A is used for supporting elliptic springs, as shown in the drawings, it ought to be long enough to reach both plates when no pressure is upon the spring. If this is attended to, a sudden jar of the carriage-box will be obviated, when the same is thrown upward, as when the wheels strike some obstruction. The rod C is put through the spring J and the rubber A, the lower end of said spring being fitted loosely, in order to pass downward when the spring J is shut together. The spring J shown in the drawings is only made to represent how the rubber spring A may be applied. Any other device requiring a spring of similar character may be benefited by its attachment.

Having thus fully described my invention, what I claim as my invention, and desire to secure by Letters Patent, is—

An India-rubber spring, constructed substantially as herein described.

I also claim the combination of an India-rubber spring, constructed as described, with an elliptic spring, for the purpose set forth.

THOMAS LONG.

Witnesses:
   J. W. ROSS,
   JAS. M. WHITEMAN.